July 22, 1930.    M. E. CHENEY    1,770,911
RELIEF VALVE FOR FORD OILING SYSTEMS
Filed Jan. 1, 1929

Inventor
Moses E. Cheney
By Attorneys
Nathan & Bowman

Patented July 22, 1930

1,770,911

UNITED STATES PATENT OFFICE

MOSES E. CHENEY, OF LA CROSSE, WISCONSIN, ASSIGNOR, BY MESNE ASSIGNMENTS, TO MOTO METER GAUGE & EQUIPMENT CORPORATION, OF LONG ISLAND CITY, NEW YORK, A CORPORATION OF DELAWARE

RELIEF VALVE FOR FORD OILING SYSTEMS

Application filed January 1, 1929. Serial No. 329,682.

This invention relates to an improvement in oil pressure gauges and particularly to those adapted for use with Ford motors.

A main object of the invention is to overcome difficulties heretofore existing with oil pressure gauges when applied to the Ford type of motor due in large part to the fact that a low reading gauge, preferably one registering 10 pounds pressure or under, is required because in hot weather or when the oil is heated up, the pressure is so low as to indicate little, if any movement of the pointer on other types of gauge, and in cold weather the pressure becomes so great as to rupture a gauge of the low reading type.

To overcome this difficulty, a low reading gauge has been mounted in conjunction with a desirable form of relief valve positioned at a point where the excessive pressure will open a valved connection to the valve chamber reservoir of the motor, whereby the oil will be pumped through part of the gauge passage to said reservoir instead of being pumped through the oil overflow pipe found on Ford cars. In bringing about this desirable result it is only necessary to remove two plugs found on the Ford motor, one at the inspection hole of the oil passage pipe and the other at one end of the oil return pipe. The relief valve is preferably inserted at the point where the last mentioned plug is located.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1:
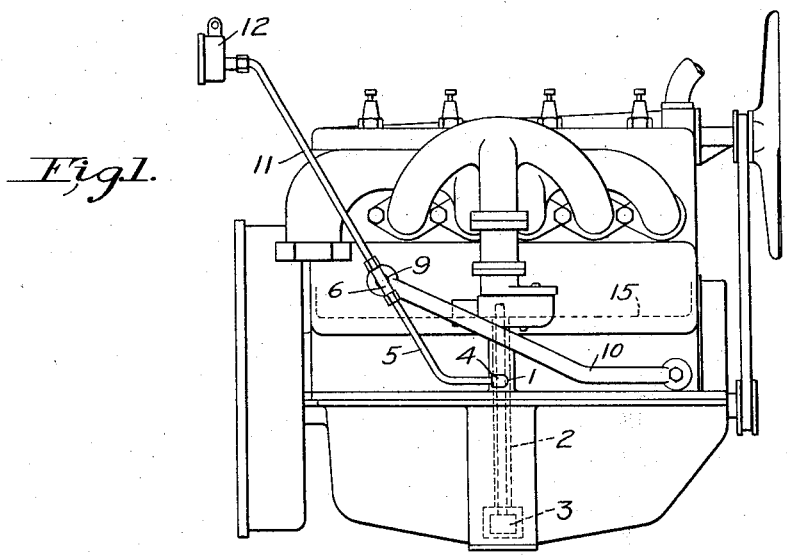
Figure 2:
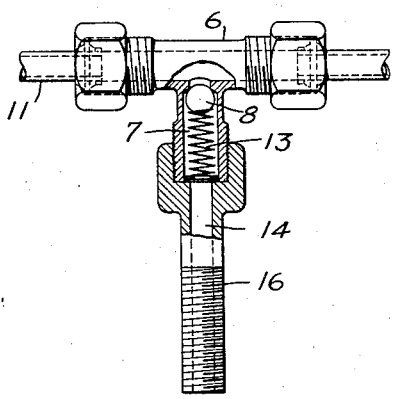
Figure 3:
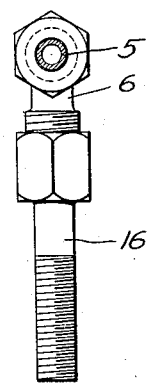

In the drawings Figure 1 is a side elevation of a Ford motor with the gauge connections duly installed thereon; Fig. 2 is a detail view of the relief valve while Fig. 3 is an end view thereof.

At the point 1 the plug covering the inspection hole in the oil pipe 2 is removed, the oil pump being located at 3. At this point 1 an elbow 4 is inserted, which is secured to one end of the short pipe arm 5 of the gauge passage. The free end of said pipe is secured to the relief valve 6 (Fig. 2) consisting of a T member having a passage 7 with a spring pressed ball valve 8. This passage is contained in a hollow cap screw 16 which is screw threaded and is capable of being screwed into the opening uncovered by the removal of the cap screw or plug at the point 9 (Fig. 1), which is preferably at the upper end of the oil return pipe 10, it being apparent that with a longer pipe the relief valve could be positioned at the lower end of said return pipe where a removable cap screw or plug is also located. The pipe 11 connects with said relief valve 6 as indicated in Fig. 2 and this pipe 11 also connects with the gauge 12. The spring 13 is set at a pressure sufficiently low as to cause the valve to remain closed thereby shutting off the passage to the valve chamber reservoir except when the pressure of the oil rises sufficiently to endanger the gauge. At such times the valve opens and the oil is merely pumped through passage 14, which is extended to the valve chamber reservoir 15, where it flows in the lubricating system without diminishing or in any way interfering with the normal lubricating system. Consequently, it is now apparent that the plugs are so located on a Ford as to enable the relief valve to be inserted at a desirable place for protecting the gauge against rupture, while maintaining the lubrication in the valve chamber reservoir up to the normal amount even after the pressure of the oil becomes so great as to endanger the gauge.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of United States:—

1. In a motor vehicle characterized as having a lubricating system, a pump, a valve chamber reservoir, a passage from said pump to said reservoir, a main oil receptacle, a return pipe extending from a point near the top of said valve chamber reservoir to the main oil receptacle thereof and a gauge of a low reading pressure type positioned near one end of the lubricating system, the combination of a spring pressure relief valve with connecting devices extending from said valve to said pump and pressure gauge the valve being positioned near one end of said return pipe and intermediate of the gauge and pump, and connections from said valve to said valve chamber reservoir whereby a continuously open passage is formed between said low pressure gauge and said pump, the spring of said relief valve being set to close the valve connection to said reservoir except when the pressure of the lubricating system exceeds the low pressure suitable for the gauge, thereby by-passing the lubricant to the reservoir in order to maintain the lubricant in the reservoir up to the normal amount.

2. In a motor vehicle characterized as having a lubricating system comprising a pump, a valve chamber reservoir, a passage from said pump to said reservoir, a main oil receptacle, a return pipe extending from valve chamber reservoir to the main oil receptacle thereof and a gauge of a predetermined low reading pressure type positioned near one end of the lubricating system having connections from the said gauge to the said pump, the combination of a spring pressure relief valve with a pipe extending from said valve to said pump, the valve being positioned near one end of said return pipe and intermediate of the gauge and pump, a passage from said pump to said valve chamber reservoir normally closed by said valve but capable of being opened whenever the pressure of said lubricating system exceeds said predetermined low pressure, thereby forming an additional passage from the pump to said valve chamber reservoir during abnormal pressure conditions of said lubricating system.

3. In a vehicle motor characterized as having a lubricant reservoir in its base; a valve chamber above said reservoir, a continuously acting pump and a suitable conduit to transport lubricant from said reservoir into said valve chamber, said conduit being formed with an inspection opening, and a return pipe connecting said valve chamber with said reservoir said return pipe being provided with plugged openings, the combination of a low pressure gauge located remote from said motor; a lubricant pipe connected at one end to said pressure gauge and coupled at its other end into said inspection opening; a pressure relief valve embodied in said pipe said relief valve having a portion comprising an overflow line threaded into one of said plugged openings.

In witness whereof, I have hereunto subscribed my name.

MOSES E. CHENEY.